UNITED STATES PATENT OFFICE.

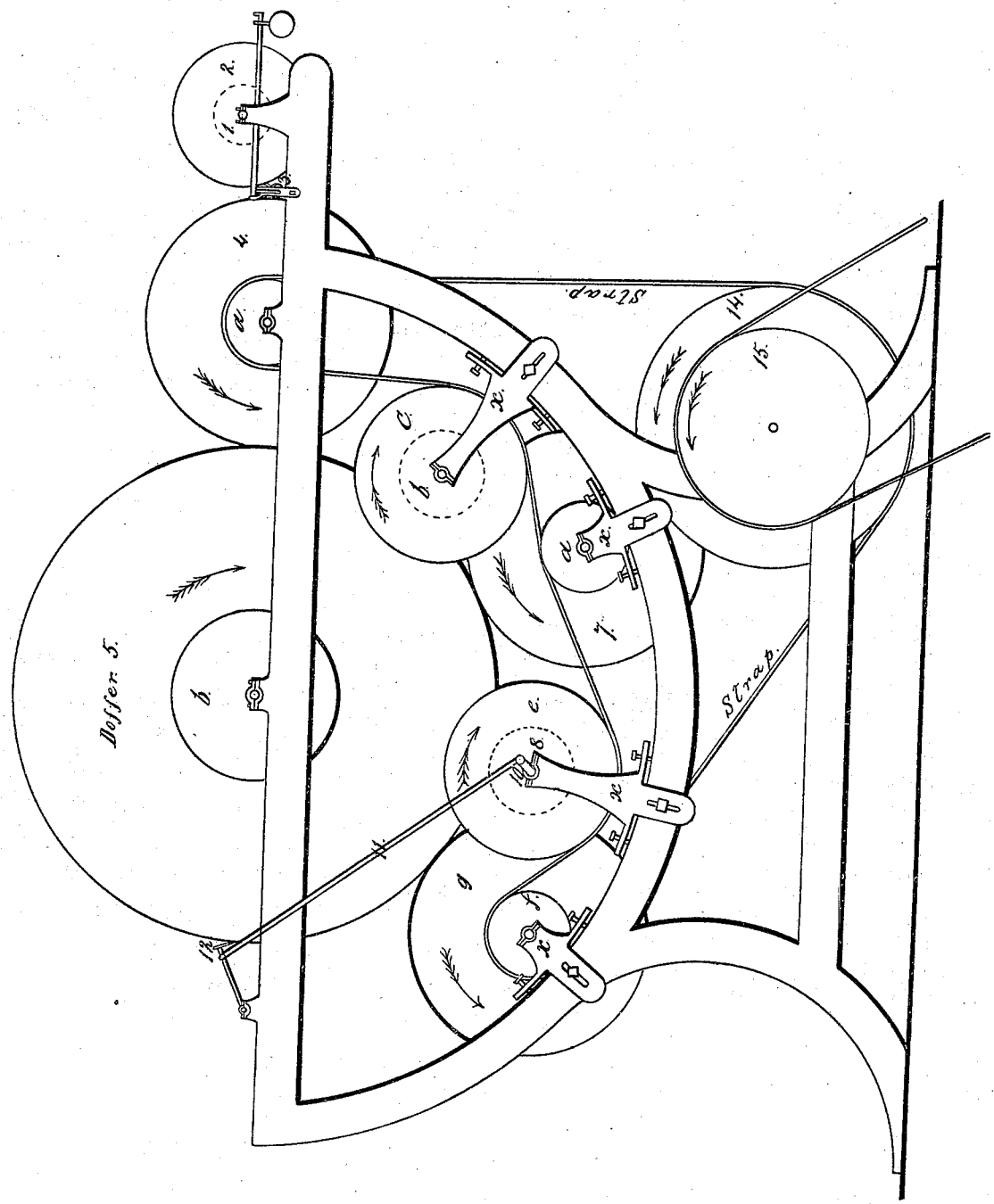

HUGH WIGHTMAN, OF PITTSBURG, PENNSYLVANIA.

IMPROVEMENT IN MACHINES FOR CARDING FIBROUS SUBSTANCES.

Specification forming part of Letters Patent No. 3,904, dated February 12, 1845.

*To all whom it may concern:*

Be it known that I, HUGH WIGHTMAN, of Pittsburg, Allegheny county, Pennsylvania, have invented a new and useful Improvement in the Construction of Carding-Machines, of which the following is a full, clear, and exact description.

My invention consists in dispensing entirely with the main cylinder of the common carding-machine and disposing the licker-in and the strippers and workers around the lower part of the periphery of the doffer, so as to act doubly, both receiving and delivering the material to be carded directly from and to the doffer without the aid of the main cylinder.

To explain my improvement and enable the public to understand it fully, I refer to the drawing hereto attached, with the references.

The main cylinder is dispensed with, and the strippers and workers are arranged around the lower part of the periphery of the doffer and so disposed as to operate as a substitute for the main cylinder and to deliver to and receive from the doffer, and worked by an endless strap.

1 2 3 are the lap-roller, counter-wheel, and feed-rollers, as in the usual machines.

4 is the licker-in, and receives from the feeding-rollers and delivers to the doffer, and has a motion contrary to what is usual.

5 is the doffer.

6, 7, 8, and 9 operate as the workers and strippers of the common carding-machines, but so moving as to receive from and deliver to the doffer.

The licker-in and the workers and strippers are thus applied immediately to the lower circumference of the doffer, delivering to and receiving from the doffer itself.

$a$ is the pulley of 4, $b$ of 5, $c$ of 6, $d$ of 7, $e$ of 8, and $f$ of 9.

10 is a crank on the end of the shaft of 8, and moving a sword or pitman 11, which works the comb 12, the material carded to be conveyed from the doffer, as is usual.

$x\ x\ x\ x$ are the puppet-head stands, sustaining the shafts of the workers and strippers.

The licker-in and workers and strippers are to be run by a winding or endless strap moved by drum 14, driven by pulley 15, or by other usual mode, so as to receive and deliver from and to the doffer, as pointed out by the arrows on each cylinder.

What I claim as my invention is—

The dispensing with the main cylinder of the common carding-machine by so disposing of the licker-in and workers and strippers around the lower part of the circumference of the doffer and giving them such motion as to deliver to and receive from the doffer itself without the aid of the main cylinder.

August 3, 1844.

HUGH WIGHTMAN.

Attest:
JAMES DUNLOP,
SAML. WIGHTMAN.